United States Patent
Katseff et al.

(12)

(10) Patent No.: US 6,233,249 B1
(45) Date of Patent: May 15, 2001

(54) METHODS AND APPARATUS FOR PROVIDING IMPROVED QUALITY OF PACKET TRANSMISSION IN APPLICATIONS SUCH AS INTERNET TELEPHONY

(75) Inventors: Howard Paul Katseff, Englishtown; Bethany Scott Robinson, Lebanon, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/565,281

(22) Filed: May 2, 2000

Related U.S. Application Data

(63) Continuation of application No. 08/819,617, filed on Mar. 17, 1997, now Pat. No. 6,075,796.

(51) Int. Cl.[7] .................................................. H04J 3/26
(52) U.S. Cl. ......................................... 370/466; 370/471
(58) Field of Search .................................. 370/466, 467, 370/471, 473, 474

(56) References Cited

U.S. PATENT DOCUMENTS

| | | | |
|---|---|---|---|
| 4,893,307 | 1/1990 | McKay et al. | 370/466 |
| 5,550,984 | 8/1996 | Gelb | 395/200.17 |
| 5,553,083 | 9/1996 | Miller | 371/32 |
| 5,553,235 | 9/1996 | Chen et al. | 395/182.18 |
| 5,555,224 | 9/1996 | Gupta et al. | 370/60.1 |
| 5,557,798 | 9/1996 | Skeen et al. | 395/650 |
| 5,799,016 | 8/1998 | Onweller | 370/401 |
| 6,075,796 | * 6/2000 | Katseff et al. | 370/466 |

OTHER PUBLICATIONS

Robert A. Hickling, "A New Breed of Communication Technology", Telescape Communications Inc., Nov. 8, 1995.

Fred Hapgood, "IPHONE", Wired, Oct. 1985.

Z. Wanlei, "Supporting fault–tolerant and open distributed processing using RPC", Computer Communications, vol. 19, No. 6, Jun. 1996, pp. 528–538.

M.R. Civanlar et al., "A practical system for MPEG–2–based video–on–demand over ATM packet networks and the WWW", Signal Processing Image Communication, vol. 8, No. 3, Apr. 1996, pp. 221–227.

Muller, N., 'Dial 1–800–Internet', Byte, pp. 83–88, Feb. 1996.

\* cited by examiner

Primary Examiner—Melvin Marcelo

(57) ABSTRACT

A digital data packet transmission process and system provides more efficient and higher quality of service in applications such as Internet telephony. In one aspect of this approach, transmission control protocol ("TCP") is used to send data from a first user or client over standard telephone lines to a local Internet service provider ("ISP"). At the ISP, the data packets are converted from TCP to user datagram protocol ("UDP"). The UDP packets are then transmitted, typically over a higher bandwidth link to another local ISP serving the recipient. The UDP packets are translated back to TCP packets and routed to the receiver. Because many existing systems currently employ UDP packets, the present approach is largely backwards compatible should a recipient be hooked up to an ISP that does not employ a TCP/UDP converter. A bidirectional TCP/UDP converter is preferable for two way communication such as Internet telephony.

22 Claims, 5 Drawing Sheets

METHODS AND APPARATUS FOR PROVIDING IMPROVED QUALITY OF PACKET TRANSMISSION IN APPLICATIONS SUCH AS INTERNET TELEPHONY

This is a continuation of application(s) Ser. No. 08/819,617 filed on Mar. 17, 1997 now U.S. Pat. No. 6,075,796.

FIELD OF THE INVENTION

The present invention relates to communication protocols in digital networks. More particularly, the invention relates to methods and apparatus for protocol conversion in order to minimize latency and to improve efficiency and quality of packet transmission in applications including Internet telephony.

BACKGROUND OF THE INVENTION

More and more information is being shared and transmitted over computer networks, and more and more two-way communication is taking place using computer networks. With the growth and ubiquity of the Internet, more and more people are becoming familiar with computer networks and desire to conduct more and more of their daily affairs using computer networks, especially the Internet. With the increasing popularity of the Internet and other networks, there is a growing demand for increased speed and quality of service. The higher the quality of a particular product or service that can be provided over the Internet, the greater will be the demand for that product or service.

Smaller and more uniform computer networks can provide high-quality services without excessive difficulty, since greater control can be maintained over the network servers and clients. In such an environment, strict standards and protocols can be dictated and maintained. The Internet, on the other hand, must serve a tremendous variety of users, all over the world, and must provide means for transferring data over paths which may be extremely circuitous, with components having differing characteristics and bandwidths. One application which is stimulating considerable interest and which is growing rapidly in popularity, but which is still subject to significant obstacles, is Internet telephony or in other words, real-time voice communication over the Internet. This application has the promise of introducing the Internet into the daily lives of large numbers of people in a substantial way. The promise is of providing a low-cost substitute for a long distance telephone service with which people are familiar, and which they use frequently, but which, because of its cost, they are constrained to use much less frequently than they might otherwise choose to if the costs were significantly lowered while still providing comparable service. Internet telephony holds forth the promise of allowing people to communicate with friends and loved ones all over the world for the cost of an making an Internet connection. In the present state of the art, there remain, however, significant obstacles to high-quality Internet telephony. These obstacles arise in part because of the protocols used by the Internet for data transmission. For real time voice traffic, latency must be kept to a minimum or the delays incurred will significantly interfere with the quality of the voice conversation. For limited-bandwidth transmission channels such as modems, transmission control protocol ("TCP"), through the use of Van Jacobsen compression, can accommodate small packets without the excessive overhead caused by a large header size. Such compression algorithms do not presently exist for user datagram protocol ("UDP").

If small packets are used for UDP transmission, the available bandwidth provided by today's modems may not be enough to accommodate them, given their large overhead. However, if large UDP packets are used for telephony, voice quality is degraded because a significant latency results. Such latency may arise because a wait is necessary to allow a large UDP packet to fill with data before it is dispatched.

On the other hand, if TCP is used to provide transmission all the way from the initial sender, over the Internet, and to the remote receiver, latencies may be too great for telephony because of the delays occasioned by detecting and resending lost packets. When measured against the quality of standard telephone service, an acceptable quality of Internet telephony service is not yet available. Thus, there exists a need in the art for methods and apparatus to provide Internet telephony data packet transmission which can accommodate a low-bandwidth connection between a user and a local host, but which can provide high-quality data transmission with low latency.

SUMMARY OF THE INVENTION

The present invention provides methods and apparatus for protocol conversion between transmission control protocol ("TCP") and user datagram protocol ("UDP"). In one aspect of the present invention, TCP is used between the user and the local host. TCP is suitable for use in a modem link between a local user and an Internet Service Provider ("ISP"), because the modem itself provides a reliable connection, detecting and resending lost data. Thus, the latencies caused by TCP's detecting and retransmitting lost packets are unlikely to occur. This provides a reliable, connection-oriented transmission which can transmit small packets within the bandwidth provided by a typical modem and consistent with local telephone connections such as those provided by twisted wire pairs and standard telephone wires connecting most people to the phone network. The latency caused by TCP's detection and resending of lost packets is tolerable, because very few packets are lost at the connection between the user and the local host.

After each packet arrives at the local host, it is converted to UDP format and transmitted over the Internet. While the UDP packets have a big header and thus a high overhead with respect to the amount of data per packet, the local host is able to transmit such packets using UDP with low latency, because the bandwidth between the local host networks is great enough to tolerate the overhead caused by the large header size of the UDP packets. When the packet arrives at the destination node of the local host network, it is reconverted to TCP, and thence transmitted to the user of the destination node. This conversion allows for the transmission of low latency small packets. By tailoring the protocols used to take advantage of the characteristics of the different connections, significant improvements in efficiency and quality of service may be achieved.

A more complete understanding of the present invention, as well as further features and advantages of the invention, will be apparent from the following Detailed Description and the accompanying drawings.

DETAILED DESCRIPTION

Figure 1:
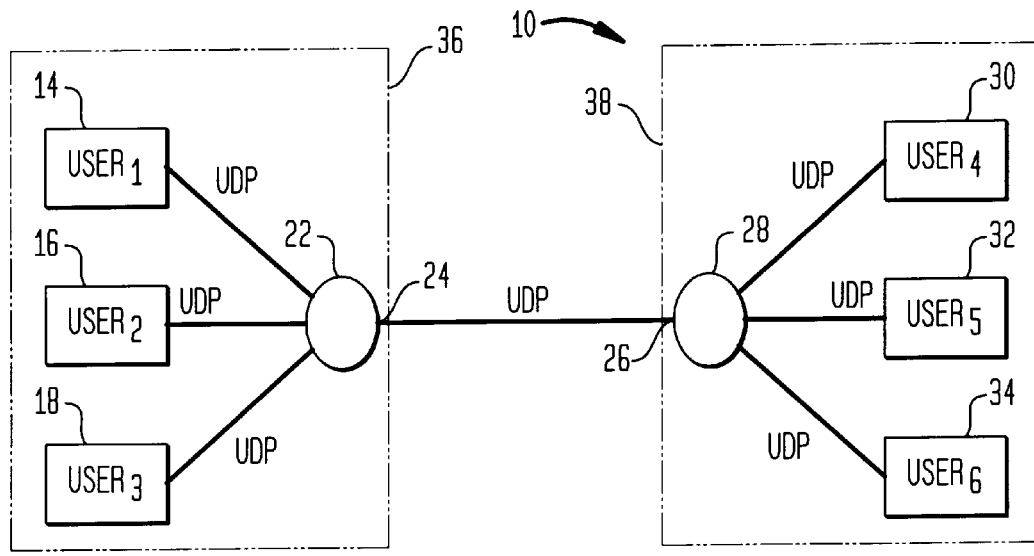
FIG. 1 is an illustration of a packet transmission network of the prior art, showing connection protocols typically employed for packet transmission between users and hosts, between hosts within a single host network, and between networks.

FIG. 1 illustrates a representative link 10 of the prior art between two data packet networks 36 and 38. First network 36 serves users$_{1-3}$, 14, 16 and 18, respectively, and second network 38 serves users$_{4-6}$, 30, 32 and 34. Users$_{1-3}$ communicate with a first local server in a first host node 22 using UDP. First host node 22 communicates with a first network communication node 24 using UDP. First network communication node 24 and a second network communication node 26 also communicate with one another using UDP. The second network communication node 26 communicates with a second host node 28 using UDP. Host node 28 communicates with users$_{4-6}$, 30, 32 and 34 using UDP.

UDP is defined at the transport layer and provides the application layer with a fast but unreliable, connectionless delivery system. UDP data units are datagrams. A datagram is encapsulated within an IP header. The header portions of UDP packets are long. Thus, the overhead for UDP packets is inherently quite large. This problem is typically overcome by making UDP packets large. With sufficiently large UDP packets, the header represents a relatively small portion of the total packet. If used to transmit small packets, however, as would be needed for high-quality Internet telephony, the large headers used by UDP would represent a large proportion of the packet size. For a typical modem connection operating at 28.8 kB, the use of small UDP packets for Internet telephony would typically overwhelm the bandwidth which could be provided by the modem. The use of small packets is best to keep down delays for quality critical applications such as Internet telephony.

The use of UDP throughout the first and second networks 36 and 38 provides a fast, connectionless data transfer system between the networks and the users, but the use of UDP is not suitable for high-quality telephony as the use of UDP requires the use of large packets in order to avoid overwhelming the capabilities of the modems of the users and the regular phone lines which typically connect Internet users to their ISPs. If TCP were used for transmission between and throughout the networks 36 and 38, however, that approach would also be unsuitable for high-quality digital telephony. Latency would again be significant, because a lost packet anywhere in the network would require the lost packet to be detected and resent. Resending a lost packet very quickly becomes superfluous in an application such as telephony or voice communication. The speaking transmitted by telephony occurs in real time. The global use of TCP would produce a significant latency in order to resend data which would be out of date and useless by the time it was resent and ultimately received.

TCP is defined at the transport layer and is responsible for reliable, connection-oriented, end-to-end error detection and correction data delivery services. TCP data units are segments and these segments are encapsulated within an IP header. TCP is a stream-oriented protocol that provides the application layer with the illusion that a continuous data pipeline is established along which application information is transmitted. The major features of TCP are reliable, connection-oriented, full duplex, urgent, stream data transfers and flow control. TCP reliability is provided through data segment sequence numbers, data receipt acknowledgments, retransmission timers, and segment checksums. Another important feature of TCP is that the header of a TCP packet can be compressed using van Jacobsen compression. The availability of van Jacobsen compression allows TCP protocol packets to have a low overhead.

Figure 2:
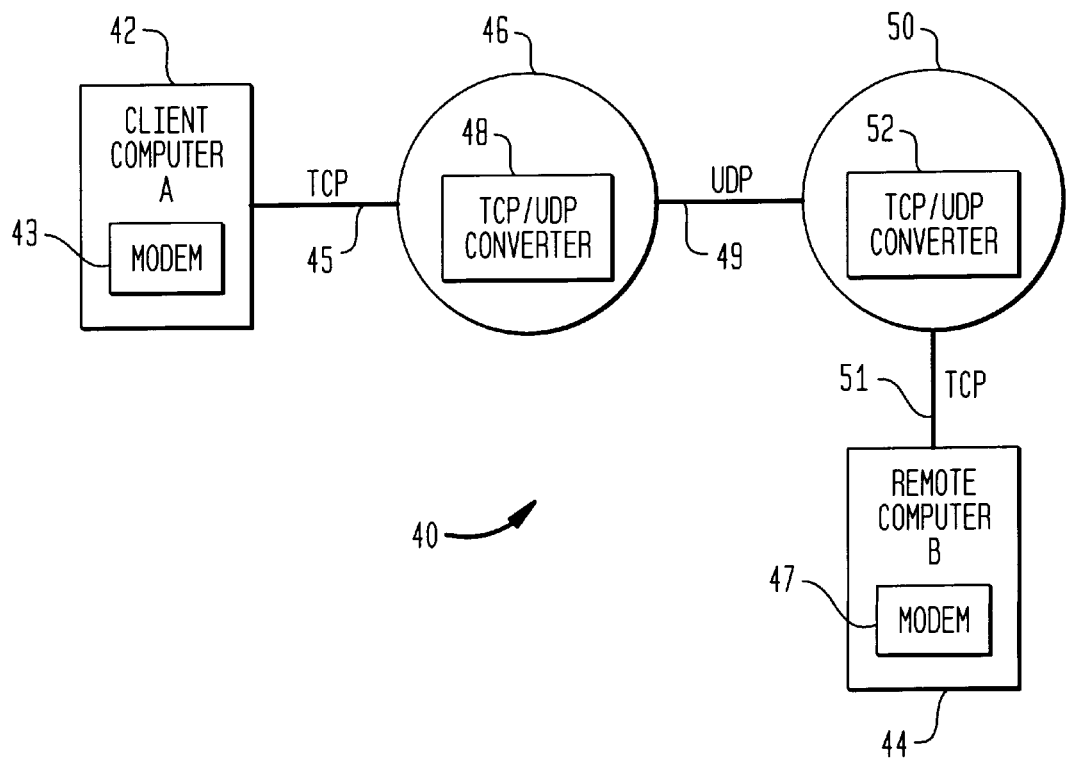
FIG. 2 is a packet transmission network employing a protocol conversion system according to the present invention, illustrating the protocols employed between the various nodes of the network.

The problems of latency and limited bandwidth are substantially addressed by the present invention. A network 40 in accordance with the present invention is illustrated in FIG. 2. While network 40 is shown as serving a first user$_A$ 42 having a client computer and a second user$_B$ 44 having a remote computer, it will be recognized that a large plurality of users may be readily served. User$_A$ 42 communicates with a first node 46 using TCP. Typically, the client computer will include a modem 43 which will typically be connected to the first node 46 by regular telephone lines 45. First node 46 passes each data packet received from user$_A$ to a first TCP/UDP converter 48, where the data packet is converted to a UDP packet. The UDP packet is then sent to a second node 50. The connection of the first and second nodes 46 and 50, respectively is typically by way of a high bandwidth connection 49.

Upon arrival at the second node 50, the UDP packet received from user$_A$ is passed to a second TCP/UDP converter 52 where it is converted to a TCP packet. The TCP packet is then transmitted to the user$_B$ 44 again typically using regular phone lines 51 and a modem 47 located in the client computer. Each of the converters 48 and converter 52 preferably operates in a two-way fashion, converting TCP to UDP or UDP to TCP as required. Thus, the network 40 illustrated in FIG. 2 is suitable for two-way transmission of data between user$_B$ 44 and user$_A$ 42 making it advantageous for applications such as Internet telephony as discussed in greater detail below.

Figure 3:
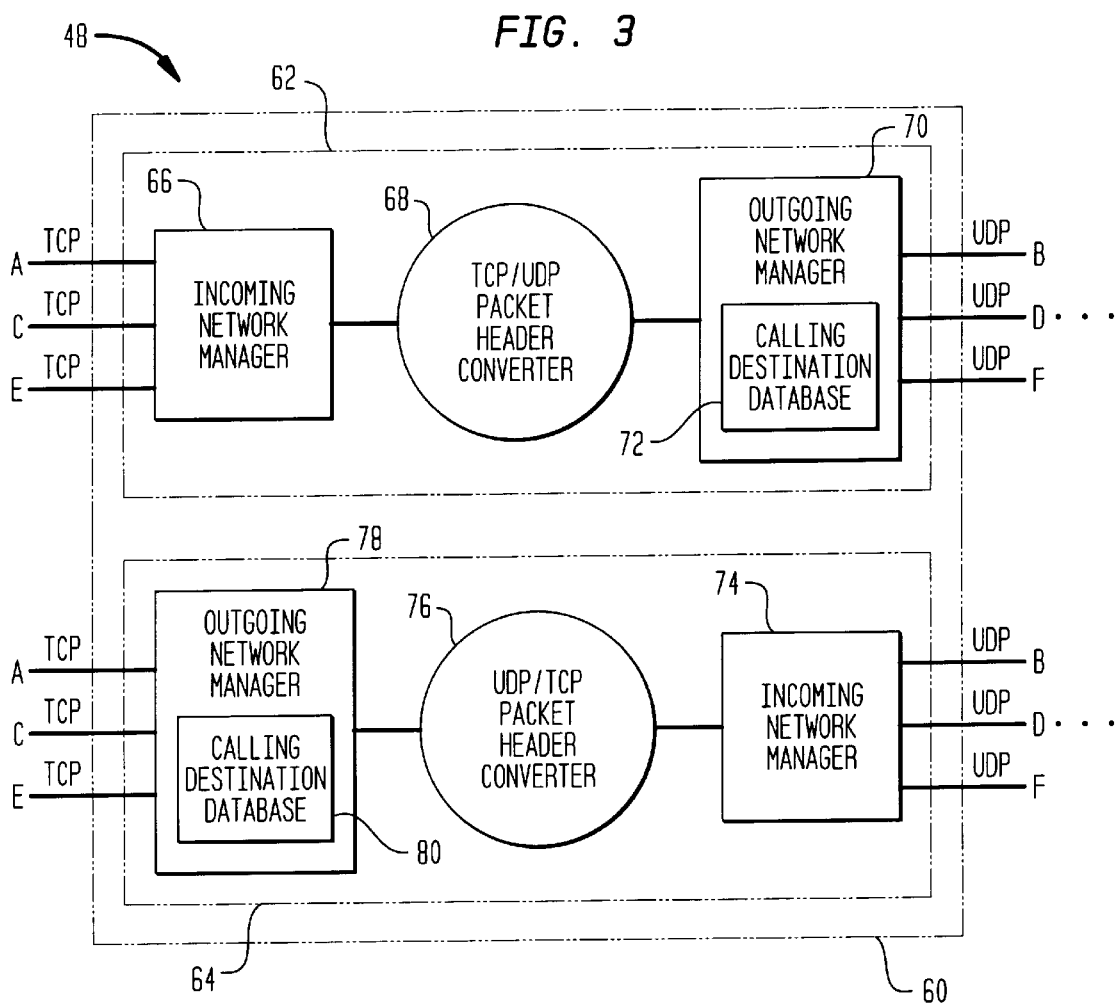
FIG. 3 is a more detailed illustration of a protocol conversion system according to the present invention.

FIG. 3 shows a more detailed illustration of the protocol converter 48 of FIG. 2. The two-way protocol converter 48 includes a TCP/UDP protocol converter 62 and a UDP/TCP protocol converter 64. The TCP/UDP protocol converter 62 includes an incoming TCP network manager 66, a TCP to UDP protocol header converter 68, and an outgoing UDP network manager 70. The outgoing UDP network manager 70 includes a calling database 72 which stores routing information for each client. This client routing information is preferably established at the time the client connects to the network. The generation and function of the calling destination database 72 will be described in greater detail below in conjunction with the discussion of FIGS. 4 and 5.

The UDP/TCP protocol converter 64 includes an incoming UDP network manager 74, a UDP to TCP protocol header converter 76, and an outgoing TCP network manager 78. The calling destination database 80 contains entries established for each client which are preferably established at the time of connection of the client with the network. The calling destination database 80 is described in greater detail below in conjunction with FIGS. 4 and 5.

The UDP/TCP protocol converter 62 receives data packets in TCP format. For example, UDP/TCP protocol converter 62 is shown as part of a digital packet telephony network linking client computers A and B, C and D, and E and F, respectively. Client computers A, C, and E each transmit a stream of digital packets to the protocol converter 48 using TCP format. Each packet transmitted by the client computers A, C, and E contains header information in TCP format. Incoming TCP network manager 66 receives the stream of data packets from the client computers A, C, and E and passes them to TCP/UDP protocol header converter 68. The TCP/UDP protocol header converter 68 removes the TCP header information from the packets, translates the TCP header information to UDP header information, and adds the UDP header information to the packets. TCP/UDP protocol header converter 68 then passes the data packets to outgoing UDP network manager 70, which reads the packet headers, looks up the destination information in calling database 72, and directs the packets to their destinations. Packets from client computer A are then routed to remote computer B, packets from client computer C to remote computer D, and packets from client computer E to remote computer F. Typically, packets will not be transmitted directly from converter 62 to a receiving remote computer, but instead will be preferably routed through another network, or another converter according to the present invention. For example, in FIG. 2 packets addressed from client computer A to remote computer B are sent from protocol converter 48 to remote network 50 and thence to protocol converter 52 before being routed to the remote computer B.

The UDP/TCP protocol converter 64 operates in a similar manner, receiving, as an illustrative example, packets from the remote computers B, D, and F to be transmitted to the client computers A, C, and E. Each packet received by protocol converter 64 from the remote computers B, D, and F contains header information in UDP format, a portion of the header information identifying the packet destination. This is because remote computers B, D and F originally transmitted the packets in UDP format, or because the packets were converted to UDP format enroute to protocol converter 64. The packets arrive at the incoming UDP network manager 74, where they are passed along to UDP/TCP protocol header converter 76. The UDP/TCP protocol header converter 76 removes the UDP headers from the packets, translates the headers into TCP format, and reconstructs the packets as TCP packets. The TCP packets are then routed to the outgoing TCP network manager 78. Outgoing TCP network manager 78 determines the destination by looking it up in the calling destination database 80. Each packet is then sent to its appropriate destination.

The remote computers B, D, and F can be either end users or further networks or converters. Thus, the protocol converter of the present invention has great flexibility. One network employing a protocol converter according to the present invention can be used to transmit data to arrive at another similar network, thus providing all the advantages described above, or, if the destination does not belong to such a network, the data packets can nevertheless be transmitted to any standard TCP/IP network. This feature provides the significant advantage of allowing the ability to communicate with users who do not subscribe to networks employing a protocol converter according to the present invention. This feature is illustrated in greater detail in FIG. 4 below.

Figure 4:
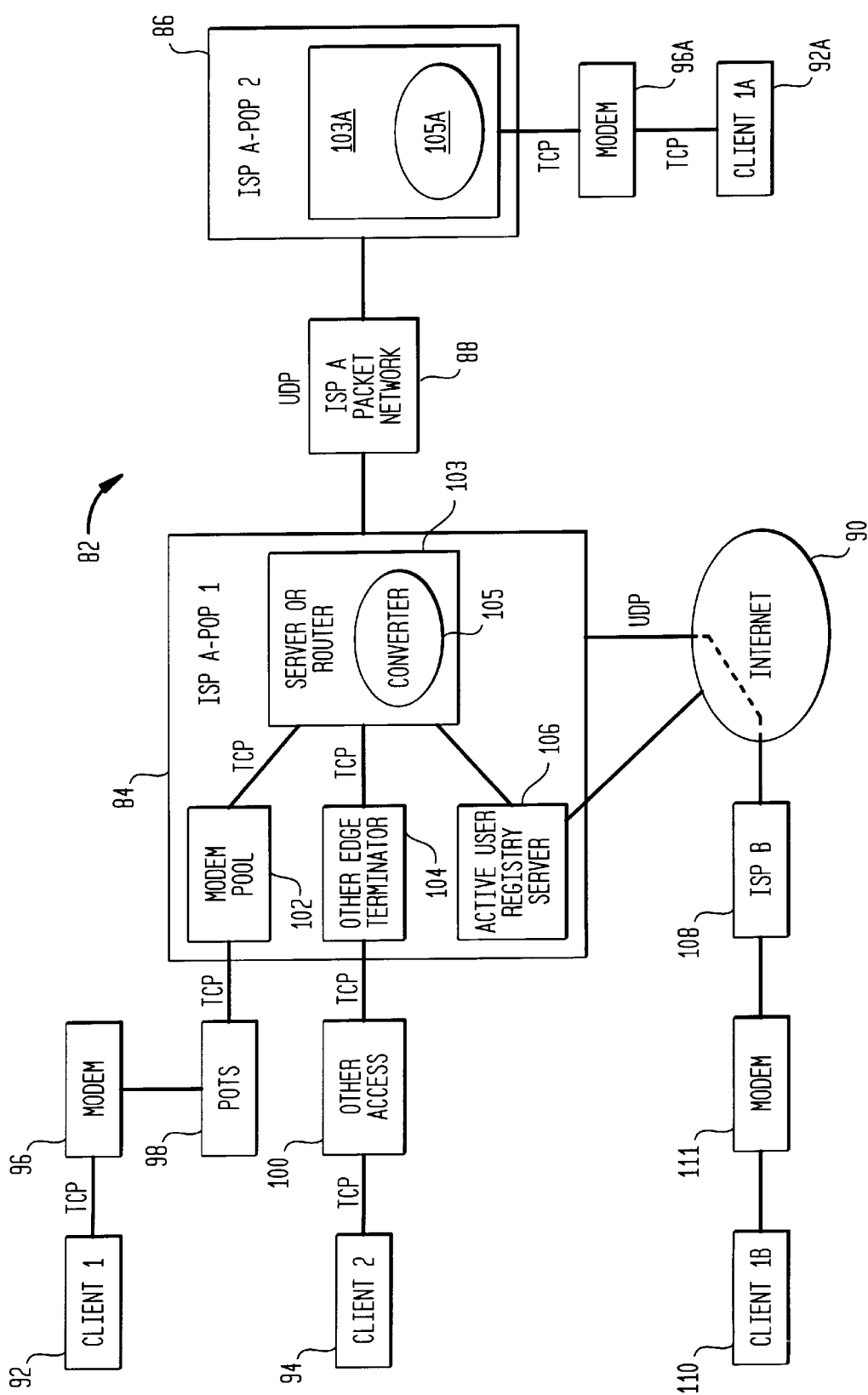
FIG. 4 is a detailed block diagram showing the use of a protocol conversion system according to the present invention, in which an active user registry server is employed in an Internet Service Provider which connects to clients using differing connection methods and which also transmits data to and from other Internet Service Providers which do not use a protocol conversion system according to the present invention.

FIG. 4 illustrates communication with a large Internet Service Provider A ("ISP$_A$") 82 using a protocol converter according to the present invention. The illustrated communication occurs both between its own clients and between its own clients and those of an Internet Service Provider B ("ISP$_B$") 108 which does not use a protocol converter according to the present invention.

ISP$_A$ 82 has multiple Points of Presence ("POP") of which POP$_1$ 84 and POP$_2$ 86 are shown as representative examples. A POP is a server system or network which typically provides access to ISP$_A$ to users within a local telephone service area. Each of POP$_1$ 84 and POP$_2$ 86 typically serves clients within a local calling area. POP$_1$ 84 and POP$_2$ 86 typically communicate with one another through ISP$_A$ packet network 88. Each of POP$_1$ 84 and POP$_2$ 86 communicates with networks and computers outside of ISP$_A$ 82 through a connection to Internet 90.

Each POP serves a large number of clients, of which client$_1$ 92 and client$_2$ 94 are shown as representative examples. Client$_1$ 92 connects to POP$_1$ 84 through a modem 96. Modem 96 provides access via the Plain Old Telephone System (POTS) 98. Client$_2$ 94 connects to POP$_1$ 84 through one of a number of alternative connections 100. Such connections may include cable, LAN/WAN connections, 800 numbers, ISDN, wireless, or any other suitable presently known connections or connections which may be developed in the future.

POP$_1$ 84 includes a modem pool 102 to accommodate clients such as the client$_1$ 92, who connect to POP$_1$ 84 through modems such as the modem 96. POP$_1$ 84 also includes a variety of other edge terminators 104, which accommodate clients such as the client$_2$ 94, who connect through alternative means. Each of the clients, client$_1$ 92 and client$_2$ 94, connects to the POP$_1$ 84 using the TCP protocol. POP$_1$ 84 also includes a router 103. Router 103 includes a converter 105, one suitable example of which is the converter 62 described above. POP$_1$ 84 also includes an active user registry server 106, which is described in further detail below in connection with the discussion of FIG. 5. The active user registry server 106 provides dynamic addressing. In other words, it establishes and stores a virtual address for each user at the time the user first establishes a session with POP$_1$ 84. Active user registry server 106 associates with each user a converter address. These converter addresses associated with each client such as the clients 92 and 94 are stored, and are used to provide necessary addressing information.

The converter 105 receives TCP packets from each of the clients 92 and 94 and converts these packets to UDP packets. POP$_1$ 84 then transmits these UDP packets to their destinations. For example, POP$_1$ 84 transmits some of the packets to other points of presence within ISP$_A$ 82 over ISP$_A$ packet network 88. When POP$_2$ 86, to take a representative example, receives a packet whose destination is one of its users, for example client$_{1a}$ 92a, it sends the packet to a router 103a where the packet is converted by converter 105a from UDP to TCP, finds the user to which the packet is addressed in its calling destination database, and transmits the packet to the client$_{1a}$ 92a, who is connected to POP$_2$ 86 via modem 96a.

To take another example, a packet's destination may be to client$_{1b}$ via ISP$_B$ 108. In this case, POP$_1$ 84 would transmit the packet over the Internet 90, where it would be routed to ISP$_B$ 108. The packet would remain in UDP protocol while ISP$_B$ 108 routed it to client$_{1b}$ 110 via modem 111.

Protocol converters in accordance with the teachings of the present invention maintain compatibility with users who are clients of systems that do not employ a protocol converter according to the present invention. A packet routed to client$_{1b}$ 110 remains in UDP protocol. While communication between client$_1$ 92 and client$_{1b}$ 110 does not have all of the advantages of a protocol converter according to the present invention, the use of a protocol converter according to the present invention does not interfere in any way with communication between $client_1$ 92 and $client_{1b}$ 110. This feature provides backwards compatibility with existing systems, and thus promotes the universal applicability of the present invention.

Figure 5:
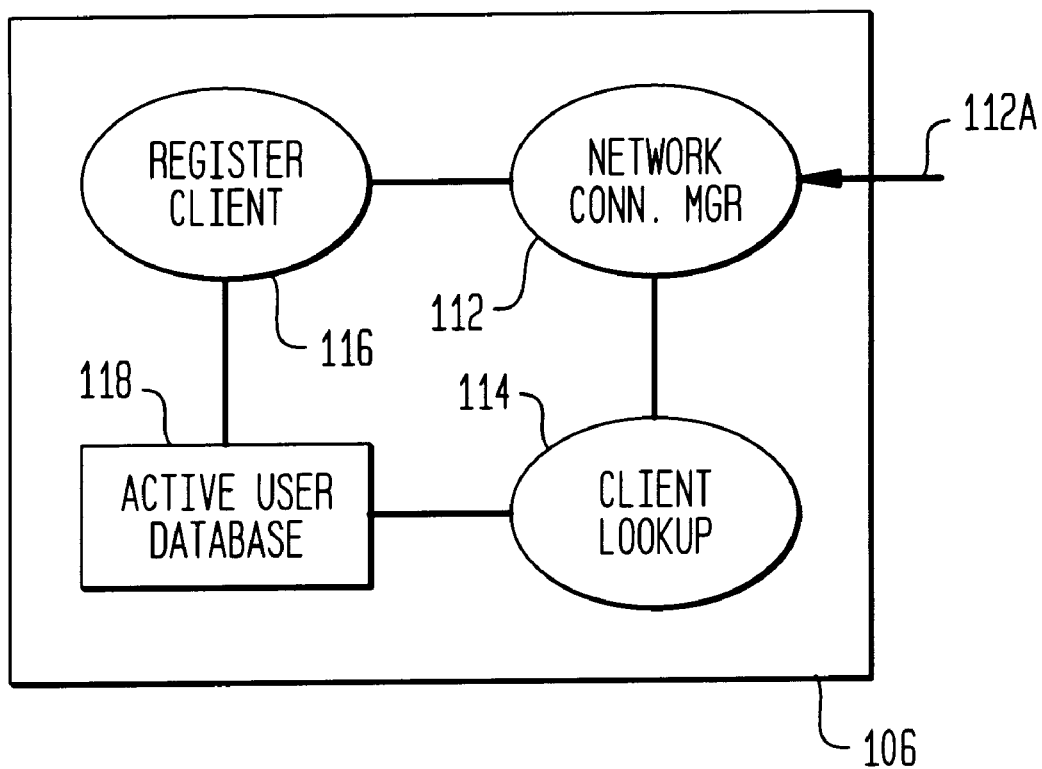
FIG. 5 is a diagram showing in greater detail the active user registry server shown in FIG. 4.

FIG. 5 is a more detailed illustration of the active user registry server 106 shown in FIG. 4. The active user registry server 106 preferably consists of a network connection manager 112, a client lookup system 114, a register client circuit 116, and an active user database 118. When a client, such as $client_1$ 92, first connects to a POP such as $POP_1$ 84, $client_1$ 92 or $POP_1$ 84 sends a register message to the network connection manager 112 which passes the register message to the register message input 112a of the register client circuit 116. The register message preferably contains a converter IP address, a client IP address, and a unique identifier for $client_1$ 92. This information is associated with $client_1$ 92 and stored in the active user database 118. When a client, such as $client_{1a}$ 92a, wants to determine how to route a communication to $client_1$ 92, it sends a message to the active user registry server 106. The network communications manager 112 determines that the message is a client look up request message, and sends it to the client lookup system 114. The system 114 does the look up for $client_1$ 92 in the active user database 118 and sends the necessary routing information to the requesting client. The requesting client now has all the routing information required to send packets to the $client^1$ 92.

Figure 6:
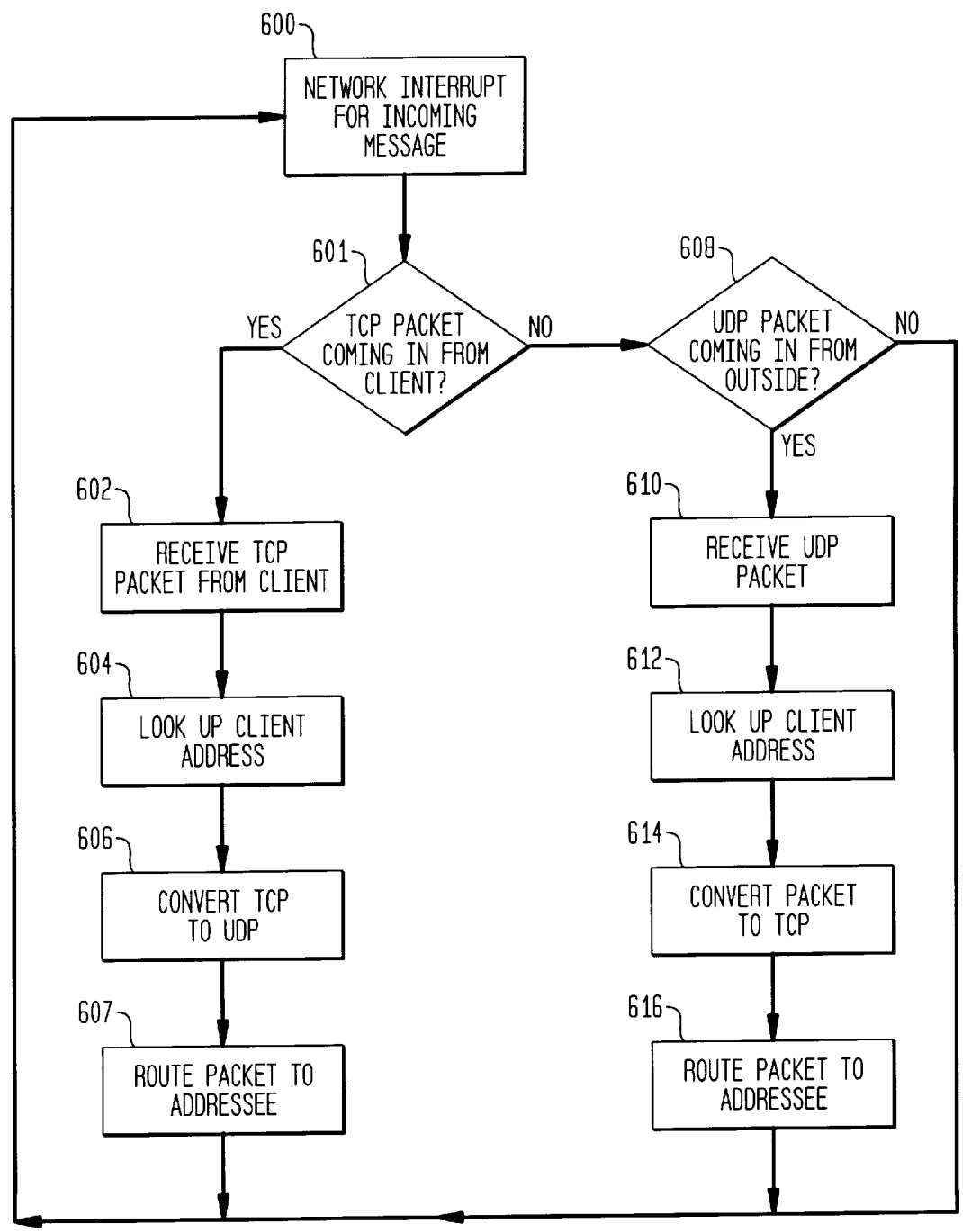
FIG. 6 is a flowchart illustrating a protocol conversion process in accordance with the present invention.

FIG. 6 is a flowchart illustrating process steps which may be suitably carried out by a protocol converter according to the teachings of the present invention. In step 600, an incoming message is detected and the operating system sends a network interrupt for the incoming message. In step 601, it is determined whether a first packet of the incoming message is in TCP format. If the packet is a TCP packet, the control process follows the branch including the steps 602, 604, 606 and 607. The packet is received, step 602, the address of the client addressee is looked up, step 604, the TCP packet is converted to UDP, step 606, and routed to the remote addressee, step 607. It will be recognized that the order of converting and lookup are not critical, and that these steps may be performed in reverse order or in parallel. If additional TCP packets are received as part of the same incoming message, the process continues to repeat itself. If no additional packets are being received by the system, the process will idle until the next network interrupt indicative of an incoming message occurs.

If in step 601, it had been determined that a TCP packet was not incoming, it would next be determined in step 608 if a UDP packet was incoming. If a UDP packet was identified, process control would follow the control process branch including steps 610–616. In step 610, the UDP packet is received, and in step 612, the client address of the addressee is looked up. In step 614, the packet is converted to TCP. In step 616, the packet is routed to the addressee. Control is then transferred back to block 600. It will be recognized that the process may be suitably extended to other packet formats by determining whether such packet formats are being received and following similar process steps.

While the present invention is disclosed in the context of a presently preferred embodiment, it will be recognized that a wide variety of implementations may be employed by persons of ordinary skill in the art consistent with the above discussion and the claims which follow below.

We claim:

1. A method of digital data transmission in a packet-switched digital network, comprising the steps of:

establishing a data link between a server and a client, said client transmitting to said server digital transmission control protocol (TCP) packets addressed to an addressee;

converting each TCP packet received from said client to user datagram protocol (UDP) format; and routing each UDP-converted packet to the addressee.

2. The method of claim 1, wherein said method is used in a packet-switched Internet telephony system.

3. The method of claim 1 wherein the step of establishing a data link between a server and a client further comprises the step of utilizing a modem at the client to connect to the server which is part of a local Internet service provider (ISP) utilizing standard telephone lines.

4. The method of claim 1 further comprising the step of:

looking up the addressee's address information in a calling destination database.

5. The method of claim 1 wherein the step of routing each UDP-converted packet to the addressee further comprises the step of routing each UDP-converted packet to a local service provider (ISP) serving the addressee.

6. The method of claim 5 wherein the step of routing each UDP-converted packet to a local ISP serving the addressee further comprises making a connection over a high bandwidth connection.

7. The method of claim 5 further comprising the step of routing each UDP-converted packet from the local ISP, to which said addressee is connected, to the addressee utilizing a modem and standard telephone lines.

8. The method of claim 1 wherein the step of routing each UDP-converted packet to the addressee further comprises the step routing each UDP-converted packet through an Internet network to a local Internet service provider (ISP) serving the addressee.

9. The method of claim 8 further comprising the step of receiving each UDP-converted packet at the addressee.

10. The method of claim 1 further comprising the step of establishing a calling destination database.

11. A method for determining routing information between a first client and a second client to provide an Internet telephony connection, said method comprising the steps of:

sending a register message which includes routing information to a network communications manager by the first client, wherein the routing information includes an internet protocol (IP) address of a converter for converting a transmission control protocol (TCP) packet to a user datagram protocol (UDP) packet;

storing the routing information in an active user database;

sending a message from said second client to the network communications manager;

if said message is a client lookup request, sending the message from the network communications manager to a client lookup system;

looking up, by said client lookup system, the routing information associated with said first client in said active user database;

sending said routing information to said second client; and providing a voice connection between said first client and said second client utilizing said routing information and said converter.

12. The method of claim 11 wherein the step of providing a voice connection comprises the substeps of:
- transmitting TCP packets from said second client to said converter;
- converting said TCP packets to UDP packets by said converter; and
- transmitting said UDP packets to said first client.

13. The method of claim 11 wherein the converter further performs the function of converting a UDP packet to a TCP packet.

14. The method of claim 13 wherein the step of providing a voice connection comprises the substeps of:
- transmitting UDP packets from said second client to said converter;
- converting said UDP packets to TCP packets by said converter; and
- transmitting said TCP packets to said first client.

15. A system for providing a voice connection utilizing digital data transmission in a packet-switched digital network, the system comprising:
- means for establishing a data link between a server and a client;
- means for establishing an Internet telephony connection utilizing said data link between said server and said client;
- a transmitter for transmitting from said client to said server digital transmission control protocol (TCP) packets addressed to an addressee, said TCP packets being comprised of digitized Internet telephony voice data;
- a converter for converting each TCP packet received from said client to user datagram protocol (UDP) format; and
- a router for routing each UDP-converted packet to the addressee.

16. The system of claim 15 further comprising:
- means for looking up the addressee's address information in a calling destination database.

17. The system of claim 15 wherein the router is further operable to route each UDP-converted packet to a local Internet service provider (ISP) connected to said addressee.

18. The system of claim 17 wherein the router is further operable to establish a connection over a high bandwidth data link connection.

19. The system of claim 17 wherein the router further operable to establish a connection to the addressee utilizing a modem and standard telephone lines.

20. The system of claim 15 further comprising a second converter for converting each UDP-converted packet to a TCP packet.

21. A method of providing Internet telephony in which signal communication protocols are tailored to take advantage of characteristics of different connections, the method comprising the steps of:
- transmitting a digitized Internet telephony transmission control protocol (TCP) packet utilizing a reliable first connection such that latencies caused by TCP's retransmission are unlikely to occur;
- converting the TCP packet to a user datagram protocol (UDP) packet for transmission on a fast second connection;
- transmitting the UDP packet utilizing the fast second connection with bandwidth great enough to tolerate UDP overhead;
- converting the UDP packet to a second TCP packet for transmission on a reliable third connection; and
- transmitting the second TCP packet utilizing the reliable third connection such that latencies caused by TCP's retransmission are unlikely to occur, said third connection communicatively connected to said second connection.

22. The method of claim 21 wherein:
- the first connection utilizes a first modem and standard telephone lines;
- the second connection utilizes a high bandwidth data link connection; and
- the third connection utilizes a second model and standard telephone lines.

* * * * *